(12) United States Patent
Saito et al.

(10) Patent No.: US 7,926,378 B2
(45) Date of Patent: Apr. 19, 2011

(54) RACK AND PINION TYPE POWER STEERING APPARATUS

(75) Inventors: Tatsuya Saito, Tochigi (JP); Yukio Tajima, Tochigi (JP); Yoshio Onoguchi, Tochigi (JP)

(73) Assignee: Showa Corporation, Saitama (JP)

( * ) Notice: Subject to any disclaimer, the term of this patent is extended or adjusted under 35 U.S.C. 154(b) by 961 days.

(21) Appl. No.: 11/082,299

(22) Filed: Mar. 17, 2005

(65) Prior Publication Data

US 2006/0075840 A1    Apr. 13, 2006

(30) Foreign Application Priority Data

Sep. 24, 2004    (JP) .................................. 2004-278236

(51) Int. Cl.
*F16H 1/04*    (2006.01)
(52) U.S. Cl. .......... 74/422; 74/89.12; 74/388 PS; 74/409
(58) Field of Classification Search ................. 74/89.12, 74/89.17, 388 PS, 422
See application file for complete search history.

(56) References Cited

U.S. PATENT DOCUMENTS

| | | | | |
|---|---|---|---|---|
| 4,127,186 A | * | 11/1978 | Koyano et al. ............... | 180/428 |
| 4,218,933 A | * | 8/1980 | Allen et al. .................. | 74/422 |
| 4,369,669 A | * | 1/1983 | Allen .......................... | 74/422 |
| 4,917,509 A | * | 4/1990 | Takano ....................... | 384/275 |
| 5,271,476 A | * | 12/1993 | Minamibata ................. | 180/400 |
| 5,819,871 A | * | 10/1998 | Takaoka ...................... | 180/444 |
| 6,155,375 A | * | 12/2000 | Gierc et al. .................. | 180/428 |
| 6,247,375 B1 | | 6/2001 | Gierc | |
| 6,390,230 B1 | * | 5/2002 | Shimizu et al. .............. | 180/444 |
| 6,435,050 B1 | * | 8/2002 | Tanke et al. ................. | 74/422 |
| 6,467,566 B1 | * | 10/2002 | Harer et al. ................. | 180/417 |
| 6,644,430 B2 | * | 11/2003 | Harer et al. ................. | 180/428 |
| 7,401,789 B2 | * | 7/2008 | Harer et al. ................. | 277/585 |

OTHER PUBLICATIONS

Japanese Patent Application Laid-Open No. 2002-274396.
Japanese Patent Application Laid-Open No. HEI 3-193556.

* cited by examiner

*Primary Examiner* — Richard W Ridley
*Assistant Examiner* — Matthew A Johnson
(74) *Attorney, Agent, or Firm* — Orum | Roth, LLC.

(57) ABSTRACT

A rack shaft is supported in an inner peripheral portion of a tubular housing of a gear housing via a rack bush. An inner peripheral portion of the rack bush is formed as a peripheral surface approximately similar to a circle in which a peripheral surface constituted by a large circular arc and a peripheral surface constituted by a small circular arc are continuously provided. The rack shaft is not in contact with the peripheral surface constituted by the large circular arc, and the peripheral surface constituted by the small circular arc is formed as a support portion of the rack shaft. The support of the rack shaft by the peripheral surface constituted by the small circular arc is not accomplished when a load applied to the rack shaft is nothing or low, but is accomplished when the load is high. Further, an engaging convex portion acting as a positioning and rotation prevention for the bush is provided in an outer peripheral portion of the rack bush.

4 Claims, 7 Drawing Sheets

RACK AND PINION TYPE POWER STEERING APPARATUS

BACKGROUND OF THE INVENTION

1. Field of the Invention

The present invention relates to a rack and pinion type power steering apparatus characterized by a rack bush slidably supporting a rack shaft and an attaching structure of the rack bush.

2. Description of the Related Art

In a rack and pinion type steering apparatus, a structure is well known in which a rack shaft is slidably supported to a rack housing corresponding to a support portion of the rack shaft by a gear housing portion near one end of the rack shaft and a housing portion near the other end. The rack shaft is slidably supported in the support portions via a rack bush made of synthetic resin, rubber or the like.

Further, since the support of the rack shaft by the rack bush at the gear housing position near one end is an engaging position between a rack tooth of the rack shaft and a pinion, specific structural consideration is given to the bush and an attachment of the bush (refer, for example, to Japanese Patent Application Laid-open No. 3-193556 (patent document 1) (page 2, FIGS. 1 and 2) and Japanese Patent Application Laid-open No. 2002-274396 (patent document 2) (pages 3 to 4, FIGS. 1 to 3).

The support of a rack shaft 01 in a gear housing portion 04 described in the patent document 1 mentioned above is achieved by one rack bush 05 comprising an elastic member made of synthetic resin, rubber or the like as illustrated in FIGS. 7A and 7B. The support of the rack shaft 01 by the bush 05 is structured so as to support a back surface side of an engagement portion between a rack tooth 02 of the rack shaft 01 and a pinion 03, so as to press the surface toward the pinion 03. The rack bush 05 is provided with a plurality of projections 06 serving as a movement inhibiting means in an axial direction under an attached state, in an outer periphery of the bush 05. The projections 06 are provided with a structure engaging with a recess portion in an inner periphery of the gear housing portion 04 and a step portion.

Support of the rack shaft 01 in the gear housing portion (the rack housing) 04 described in the patent document 2 mentioned above is achieved by a cylindrical rack bush 05 constituted by an elastic member made of a synthetic resin or the like as illustrated in FIGS. 8A to 8C. The bush 05 is provided with a pair of pressing projections 06 in which a part of a cylindrical cross section is bulged to an inner surface side of the cylinder. The projection 06 is structured so to extend all the region in an axial direction of the bush 05, and is arranged to be approximately one half in a circumferential direction of the bush 05.

The rack bush 05 is structured such that one end surface of a cylindrical shape thereof is brought into contact with a step portion 041 in an inner periphery of the gear housing portion 04 so as to be positioned in an axial direction and to be press fit into a large-diameter portion 042 of the housing 04. A pair of pressing projections 06 is brought into contact with a back surface of the rack tooth 02 of the rack shaft 01, thereby pressing the rack shaft 01 in a direction of the pinion 03, that is, a direction of the engagement portion between the rack tooth 02 and the pinion 03. This secures the engagement between the rack tooth 02 and the pinion 03 with no play, whereby a rotating torque of the pinion 03 is smoothly transmitted to the rack shaft 01.

In this case, the rack bush (the elastic member) described in the patent document 1 is provided with a structure in which a projection in an outer peripheral portion engages with a recess portion or a step portion formed in an inner periphery (an inner surface) of a gear housing so as to inhibit the bush from moving. However, a relatively large deformation is generated in the bush during insertion into the inner peripheral portion of the gear housing because of the structure of the rack bush. Accordingly, if the bush is not made of a soft material, the bush can not be inserted. Further, it is considered that a slit may be provided in the bush for the purpose of making it easier to insert the bush, however, in this case, the bush tends to be disconnected.

Further, the rack bush (the elastic member) described in the patent document 2 can be easily pressure inserted from an axial direction during attaching. However, since no positioning means acting as a rotation prevention means in a rotating direction is provided, it is difficult to achieve an accurate positioning in the rotating direction of the pressure insertion of the rack bush. Since displacement in the rotating direction tends to be generated together with a passage of time after being attached in accordance with the pressure insertion, it is difficult to keep a proper engagement between the rack tooth of the rack shaft and the pinion, and it is difficult to effectively inhibit a gear engaging sound from being generated.

Under these circumstances, it is desirable to provide the rack and pinion type power steering apparatus mentioned above in which an improvement relating to the structure of the rack bush and the support structure by the bush is provided in the slidable support of the rack shaft by the rack bush at the gear housing position corresponding to the engagement portion between the rack tooth of the rack shaft and the pinion. This effectively inhibits the play due to the oscillation of the rack shaft and makes the engagement between the rack tooth of the rack shaft and the pinion proper, whereby it is possible to effectively inhibit the gear engaging sound generated from the engagement portion.

SUMMARY OF THE INVENTION

An object of the present invention is to secure a proper engagement between a rack tooth and a pinion so as to inhibit a gear engaging sound from being generated, by creating a support for a rack shaft at a gear housing position by using a rack bush provided with a characteristic surface in inner and outer peripheries thereof.

The present invention relates to an improved structure of a rack and pinion type power steering apparatus for solving the problem mentioned above, and more particularly relates to the provision of an improved structure for the steering apparatus in which one object of the improvement is to prevent play in an engagement portion between a rack tooth and a pinion. Further, the present invention provides a rack and pinion type power steering apparatus slidably supporting a rack shaft to a gear housing via a bush made of a synthetic resin or the like. The bush is provided with a convex portion engaging with an engaging recess portion in an inner surface portion of a gear housing in an outer peripheral portion, and is fixed by a locking member.

Further, the present invention provides a support structure for a rack shaft in a rack and pinion type power steering apparatus slidably supporting a rack shaft to a gear housing via a bush made of a synthetic resin or the like. The rack shaft is supported at two points 9 and 14 under low load conditions, and is supported at three points 9, 14 and 8 under high load conditions.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 2A and 2B are views showing a main structure portion of the present invention, in which FIG. 2A is a side cross sectional view of the same and FIG. 2B is a cross sectional view along a line A-A in FIG. 2A;

FIGS. 4A and 4B are views showing a rack bush in accordance with the present invention, in which FIG. 4A is a side elevational view and FIG. 4B is a front elevational view;

FIGS. 6A and 6B are views showing a rack bush in accordance with the other aspect of the present invention, in which FIG. 6A is a side elevational view and FIG. 6B is a front elevational view;

FIGS. 7A and 7B are views showing a main structure portion in a conventional power steering apparatus, in which FIG. 7A is a side cross sectional view of the same and FIG. 7B is a cross sectional view along a line 0A-0A in FIG. 7A; and FIGS. 8A to 8C are views showing a main structure portion in the other aspect of the conventional power steering apparatus, in which FIG. 8A is a side cross sectional view of the same, FIG. 8 is a cross sectional view along a line 0B-0B in FIG. 8A and FIG. 8C is a perspective view of a bush.

DESCRIPTION OF THE PREFERRED EMBODIMENTS

A description will be given below of an embodiment in accordance with the present invention illustrated in FIGS. 1 to 6B.

Figure 1:
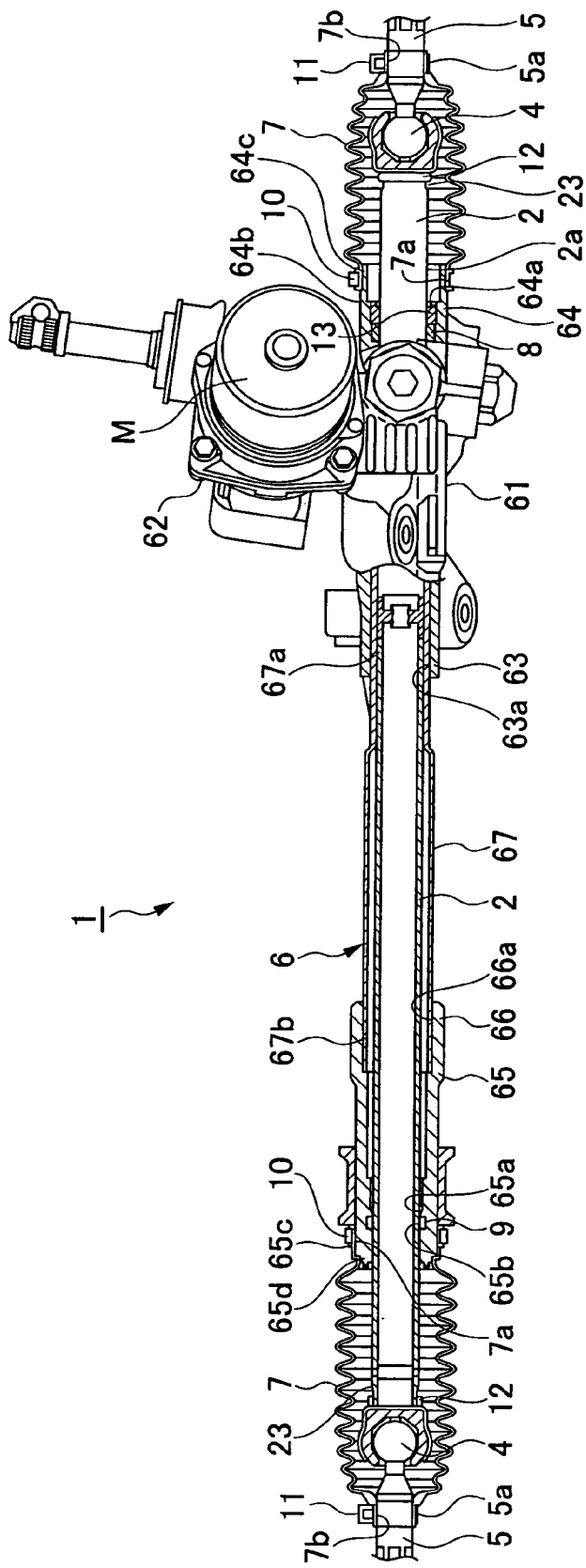
FIG. 1 is a view of an entire rack and pinion type power steering apparatus in accordance with the present invention, in which a part thereof is shown by a cross section.

In FIG. 1, there is illustrated an approximately entire view of a rack and pinion type power steering apparatus 1 in accordance with the present invention in a state in which a part thereof is shown by a cross section.

Figure 2A:
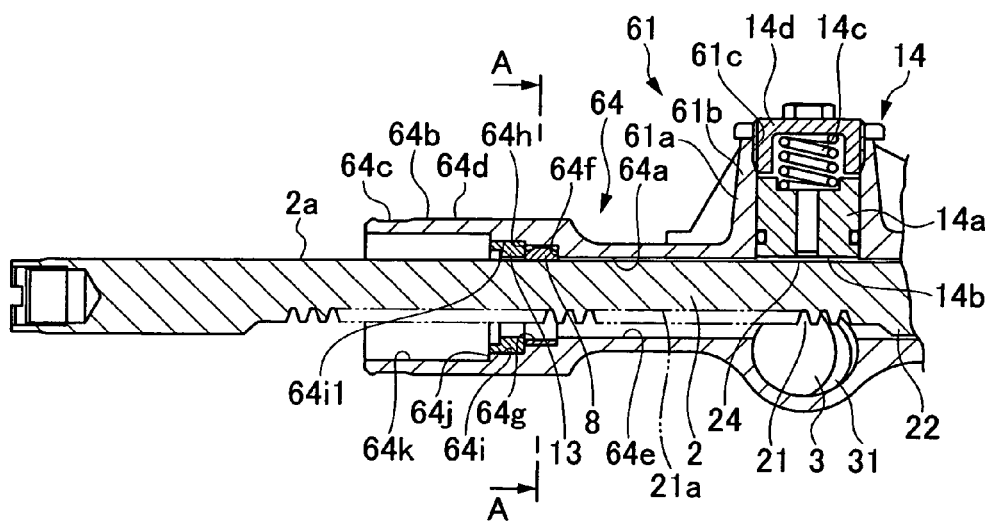
Figure 2B:
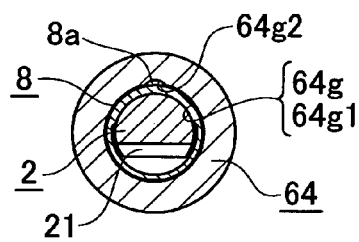
Figure 3:
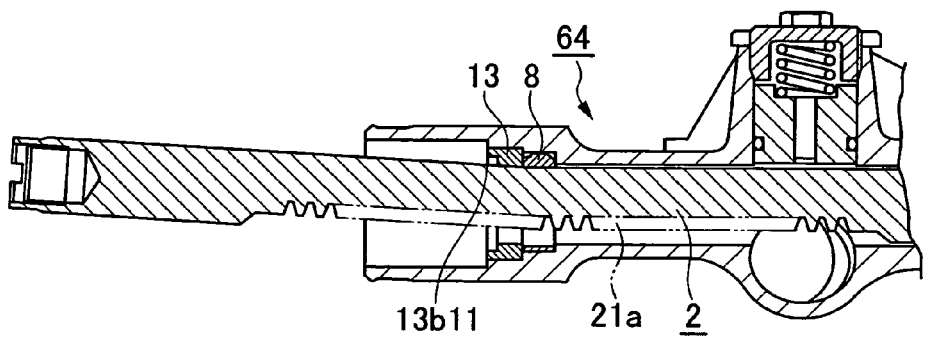
FIG. 3 is a view showing one operation aspect in FIG. 2A.

With reference to FIGS. 1 and 2, the power steering apparatus 1 is provided with a steering handle and a steering shaft which are not illustrated, an electric motor M for applying an assist steering force, and is provided with a rack shaft 2. Pinion 3 (refer to FIG. 2A) inputting a handle steering force to the rack shaft 2, a gear 21 of the rack shaft 2 with which the pinion 3 is engaged, tie rods 5 and 5 connected via ball joints 4 and 4 in both ends of the rack shaft 2 and transmitting a motion of the rack shaft 2 to a steered wheel (not shown), are also provided. A rack housing 6 receiving and surrounding a periphery of the rack shaft 2 is provided, as well as a gear housing 61 receiving an engagement portion between the pinion 3 and the rack tooth 21 and corresponding to a part of the rack housing 6.

The electric motor M is integrally attached to an extension housing 62 of the gear housing 61. An assist steering force is transmitted to a steering force output shaft 31 (refer to FIG. 2A) provided with the pinion 3 via a worm gear mechanism (not shown) within the housing 62. The rack shaft 2 can be moved forward and backward at a predetermined stroke in an axial direction within the housing 6 via the engagement between the pinion 3 of the steering force output shaft 31 and the rack tooth 21. Accordingly, the rack tooth 21 is formed as a gear portion 21a having a predetermined length. The gear portion 21a of the rack shaft 2 corresponds to a portion in which a part of a side surface of a circular cross sectional shape of the rack shaft 2 is notched around the predetermined length and the gear is formed (refer to FIG. 2A).

The forward and backward movement in the axial direction of the rack shaft 2 at the predetermined stroke within the rack housing 6, that is, the forward and backward movement of the rack shaft 2 in a lateral direction illustrated in FIG. 1 is transmitted to the tie rods 5 and 5 connected via the ball joints 4 and 4 in both ends of the rack shaft 2. The motion of the tie rods 5 and 5 is further transmitted to the steered wheel (not shown) for steering, whereby a direction change of the vehicle is executed.

The rack housing 6 receiving and surrounding the rack shaft 2 includes the gear housing 61 in a right end side illustrated in FIG. 1 surrounding a portion near both end portions of the rack shaft 2, a left housing 65 in a left end side, and a hollow tube housing 67 connecting between a tubular housing 63 extending from a left side of the gear housing 61 and a tubular housing 66 extending from a right side of the left housing 65. The hollow tube housing 67 is structured such that a right end outer peripheral portion 67a is press fit and held to an inner peripheral portion 63a of the left tubular housing 63 of the gear housing 61, and a left end outer peripheral portion 67b is press fit and held to a right side inner peripheral portion 66a of the tubular housing 66 in the left housing 65, thereby entirely receiving and surrounding the rack shaft 2 except for both end portions covered by bellows 7 and 7 in the rack shaft 2.

The rack shaft 2 is supported so as to freely move forward and backward at a predetermined stroke in an axial direction, that is, an illustrated lateral direction within the rack housing 6 corresponding to the support portion of the rack shaft 2 as already described above. The support of the rack shaft 2 in the rack housing 6 is accomplished at three positions, including a position of the gear housing 61 close to a right end of one rack shaft 2, a position of the left housing 65 close to a left end of the other rack shaft 2, and a position mentioned below of a pressing portion 14b (refer to FIG. 2A) of a pressing apparatus 14 in a back portion of the rack tooth 21 in the engagement portion between the rack tooth 21 and the pinion 3.

The support of the one by the rack housing 6 of the rack shaft 2, that is, the support of the rack shaft 2 at the position of the gear housing 61 close to the right end of the rack shaft 2 in FIG. 1 is achieved by being slidably supported to the tubular housing 64 extending from the right side of the gear housing 61. The housing 64 extends in a tubular shape at the predetermined length so as to coaxially surround the outer peripheral portion 2a of the rack shaft 2 via a rack bush 8 mentioned below made of a synthetic resin or the like.

The support of the other by the rack housing 6 of the rack shaft 2, that is, the support of the rack shaft 2 at the position of the left housing 65 close to the left end of the rack shaft 2 in FIG. 1 is achieved by being supported via a slidable ring member 9 fitted into an annular recess portion 65b formed in an inner peripheral portion 65a close to the end portion of the left rack shaft 2 of the left housing 65.

The position of the gear housing 61 and the position of the left housing 65 which correspond to one and the other support portions of the rack shaft 2 are both portions structuring both ends of the rack shaft 2. Accordingly, the support portions of the rack shaft 2 are adjacent to the ball joint portions 4 and 4 corresponding to the connecting portions to the tie rods 5 and 5. The bellows 7 and 7 covering the ball joint portions 4 and 4 for protection are attached to the portions. An annular recess portion 64c provided in an outer peripheral portion 64b in a right end side of the tubular housing 64 extending from the right side of the gear housing 61 is formed as a structure portion provided for attaching the bellows 7, in the one support portion of the rack shaft 2. An outer peripheral portion 65c in a left end side of the left housing 65 is formed as a structure portion provided for attaching the bellows 7, in the other support portion of the rack shaft 2.

The attachment of the bellows 7 at the position of the gear housing 61 is achieved by the annular recess portion 64c of the outer peripheral portion 64b of the tubular housing 64. That is, one end opening portion 7a of the bellows 7 is fitted to the annular recess portion 64c so as to be fastened and caulked by a bellows band 10 from an outer side of the opening portion 7a of the bellows 7. The other end opening portion 7b of the bellows 7 is fitted to an outer peripheral portion 5a of the tie rod 5 so as to be fastened by a tie rod clip 11. Thereby, the attachment of the bellows 7 is achieved.

Further, the attachment of the bellows 7 at the position of the left housing 65 is achieved by the outer peripheral portion 65c of the housing 65. That is, the one end opening portion 7a of the bellows 7 is fitted to the outer peripheral portion 65c of the housing 65 so as to be fastened and caulked by the bellows band 10. The other end opening portion 7b of the bellows 7 is fitted to the outer peripheral portion 5a of the tie rod 5 so as to be fastened by the tie rod clip 11, thereby the attachment of the bellows 7 is achieved.

The rack shaft 2 is provided with annular stopper rubbers 12 and 12 each having a predetermined width and made of a synthetic resin, a rubber or the like, at positions adjacent to the ball joint portions 4 and 4 in both right and left ends of the rack shaft 2. The stopper rubbers 12 and 12 are press fit and fixed to slightly narrower processed portions 23 in both the right and left ends of the rack shaft 2.

One stopper rubber 12 is brought into contact with an end of a stopper piece 13 mentioned below fitted to the inner peripheral portion 64a of the rightward extending tubular housing 64 of the gear housing 61 in a moving end of a leftward movement in the stroke of the forward and backward movement of the rack shaft 2 in the lateral direction in FIG. 1. The other stopper rubber 12 is brought into contact with a left end 65d of the left housing 65 in a moving end of a rightward movement. These respective contacts controllably inhibit the rack shaft 2 from moving in the lateral direction, thereby determining the stroke in the forward and backward movement of the rack shaft 2 in the lateral direction with respect to the rack housing 6.

The power steering apparatus 1 is approximately provided with the structure mentioned above, and the description is given of an outline of the support structure in the rack housing 6 of the rack shaft 2. In this case, a description will be given in detail of one support portion of the rack shaft 2, that is, the support structure of the rack shaft 2 at the position of the gear housing 61 with reference to FIG. 2A.

As shown in FIG. 2A, there is illustrated in an enlarged manner the support portion by the tubular housing 64 extending from a left side in the drawing (the right side in FIG. 1) of the gear housing 61 corresponding to the one support portion of the rack shaft 2. The tubular housing 64 of the gear housing 61 corresponds to the tubular housing 64 extending to the left side in FIG. 2A in the axial direction of the rack shaft 2 from the receiving space of the engagement portion between the rack tooth 21 in the gear housing 61 and the pinion 3. The rack 2 is structured so as to freely move forward and backward in the axial direction, that is, the lateral direction in the drawing in the inner portion of the tubular housing 64.

The receiving space of the engagement portion between the rack tooth 21 of the gear housing 61 and the pinion 3 is provided with a space for the rack tooth 21 of the rack shaft 2 and the pinion 3 engaging therewith, and is provided with a receiving space for the pressing apparatus 14. This presents a structure where one support portion of the rack shaft 2 applies a pressing force for pressing the back surface side 24 toward the pinion 3 side against the pressure caused by the engagement of the gear 21, in the opposite side to the rack tooth 21 of the engagement portion between the rack tooth 21 and the pinion 3, that is, the back surface side 24 of the rack tooth 21.

The pressing apparatus 14 pressing the back surface side 24 of the rack tooth 2 includes the following construction; a cylinder 61b is formed in a boss portion 61a extending in a direction orthogonal to the axial direction of the rack shaft 2 of the gear housing 61; a rack guide 14a is slidably movable within the cylinder 61b and is provided with a flat pressing portion 14b brought into contact with the back surface side 24 of the rack tooth 21 of the rack shaft 2 in a leading end thereof; a spring 14c is arranged in a back portion (an upper portion in the drawing) of the rack guide 14a; a cap 14d seals an upper opening portion 61c of the cylinder 61b by being screwed into the upper opening portion 61c of the cylinder 61b and pressing the spring 14c in a back portion of the rack guide 14a. A pressing force of the rack guide 14a by the spring 14c is regulated by adjusting a screwing amount of the cap 14d.

The tubular housing 64 of the gear housing 61 is formed as an expanded portion 64d having a large outer diameter in an extending end direction. An annular recess portion 64c provided for attaching the bellows 7 mentioned above is provided in an outer peripheral portion 64b of the end portion. An inner peripheral portion 64a of the tubular housing 64 is formed as a hole portion 64e having a slightly smaller inner diameter in the receiving space side of the engagement portion between the rack tooth 21 and the pinion 3. The inner peripheral portion 64a is provided with a first enlarged hole portion 64g in which a first step portion 64f is formed from the hole portion 64e having the small inner diameter and an inner diameter is enlarged, a second enlarged hole portion 64i in which a second step portion 64h is formed from the enlarged hole portion 64g and an inner diameter is enlarged, and a third enlarged hole portion 64k in which a third step portion 64j is formed from the enlarged hole portion 64i and a diameter is enlarged.

The small hole portion 64e having the small inner diameter in the inner peripheral portion 64a of the tubular housing 64 is preferably provided with a sufficient inner diameter to make the rack tooth 21 of the rack shaft 2 and the shaft portion 22 forming rack tooth 21 to be movable without encumbrance, and corresponds to a hole extending at a predetermined length as a straight line having a circular cross section. The first enlarged hole portion 64g continuously provided in the small hole portion 64e corresponds to a hole portion to which the rack bush 8 mentioned below is fitted. An inner peripheral portion 64g1 thereof is provided with an engaging recess portion 64g2 (refer to FIG. 2B) doubling with a rotation prevention and a positioning for the fitted bush 8.

The engaging recess portion 64g2 of the inner peripheral portion 64g1 in the first enlarged hole portion 64g of the tubular housing 64 is a groove formed by directly cutting a step portion 64h on the boundary between the second enlarged hole portion 64i and the first enlarged hole portion 64g. The step portion 64h substantially corresponds to a further enlarged inner diameter portion in the axial direction. The rack bush 8 described in detail later can be inserted into the first enlarged hole portion 64g from the second enlarged hole portion 64i, by an engaging convex portion 8a in an outer peripheral portion 8b thereof being positioned with the engaging recess portion 64g2 so as to be pressed in the axial direction.

Further, the second enlarged hole portion 64i is a hole portion to which the stopper piece 13 is fitted. An outer peripheral portion 13a (refer to FIG. 5) of the stopper piece 13 mentioned below is press fit into an inner peripheral portion thereof. The second enlarged hole portion 64i inhibits the rack bush 8 fitted into the first enlarged hole portion 64g from moving in an axial direction.

The third enlarged hole portion 64k continuously provided in the second enlarged hole portion 64i surrounds the outer peripheral portion 2a of the rack shaft 2 while keeping a sufficient gap by which the rack shaft 2 is not in contact therewith even when the rack shaft 2 is deflected due to a high load. The annular recess portion 64c provide for attaching the bellows 7 mentioned above is formed in the outer peripheral portion 64b near an opening in an end portion thereof.

The rack shaft 2 moves so as to freely move forward and backward in the axial direction, that is, in the lateral direction in the drawing in the inner portion of the tubular housing 64 as described above. The rack bush 8 is fitted into the first enlarged hole portion 64g, and the rack shaft 2 is supported to the tubular housing 64 via the bush 8 in the forward and backward movable manner.

Figure 4A:
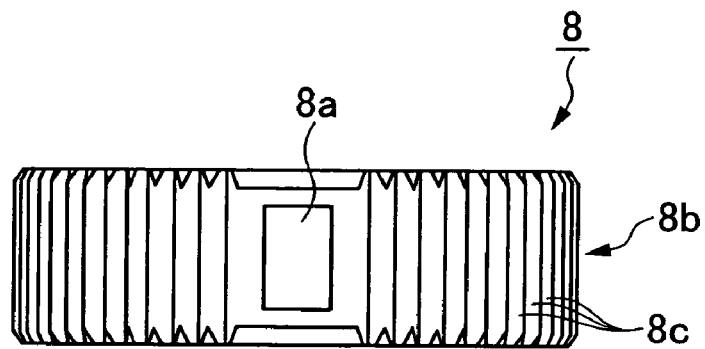
Figure 4B:
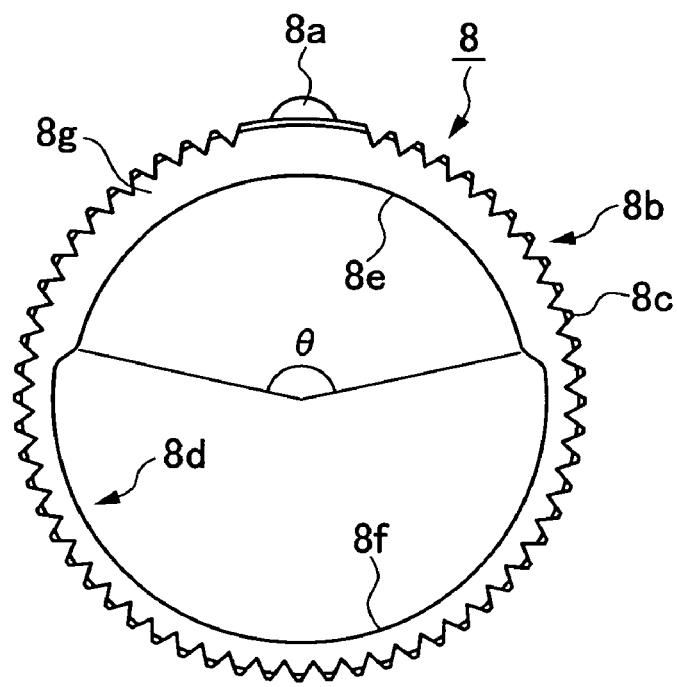

The rack bush 8 is made of a synthetic resin, a rubber or the like, and is formed in a ring-like outer shape having a predetermined width as illustrated in FIGS. 4A and 4B, and the width is uniform. The ring is structured such that the outer peripheral portion 8b is formed in a complete round shape, an outer diameter is approximately equal to a diameter of the inner peripheral portion 64g1 (refer to FIG. 2B) of the first enlarged hole portion 64g of the tubular housing 64, and the outer peripheral portion 8b of the ring is provided with the engaging convex portion 8a for positioning the bush 8 with respect to the tubular housing 64 when fitting the bush 8.

The engaging convex portion 8a is structured so as to position the bush 8 with respect to the tubular housing 64 by being fitted to the engaging recess portion 64g2 provided in the inner peripheral portion 64g1 of the first enlarged hole portion 64g of the tubular housing 64. A concave-convex portion 8c having a smaller height than that of a plurality of chevron-shaped engaging convex portions 8a extending in a width direction of the ring and being in parallel to each other is provided all around the periphery of the other portions than the portion provided with the engaging convex portion 8a in the ring outer peripheral portion 8b.

An inner peripheral portion 8d of the rack bush 8 is formed as an annular peripheral surface similar to a circle in which peripheral surfaces 8e and 8f of annular peripheral surface portions obtained by two circular arcs having different radii are continuously provided on a periphery of the inner peripheral portion 8d in a front view. Since an outer shape of the ring forming the bush 8 is the complete round shape, a corresponding portion to the peripheral surface 8f formed by the circular arc having the larger radius is relatively thin, and a corresponding portion to the peripheral surface 8e formed by the circular arc having the smaller radius is relatively thick. The support of the rack shaft 2 by the annular peripheral surface of the inner peripheral portion 8d of the bush 8 is not substantially employed when a load applied to the rack shaft 2 is no load or a low load and the rack shaft 2 is not deflected or in a condition in which the deflection is small. When the load applied to the rack shaft 2 is a high load and the rack shaft 2 is deflected, the support is executed in the peripheral surface 8e formed by the circular arc having the small radius, that is, substantially in the thick portion 8g of the ring.

The support portion corresponding to the peripheral surface 8e formed by the circular arc having the small radius in the rack shaft 2 corresponds to a back surface side of the rack tooth 21 opposite to a forming side of the rack tooth 21.

The peripheral surface 8f formed by the circular arc having the large radius in the inner peripheral portion 8d of the rack bush 8 corresponds to the forming side of the rack tooth 21 in the rack shaft 2. However, the peripheral surface 8f is not in contact with the rack tooth 21. The positioning mentioned above of the bush 8 with respect to the rack shaft 2 in the attachment of the rack bush 8 is easily achieved by the positioning by the inner peripheral portion 64a of the tubular housing 64 mentioned above. More specifically, the positioning is achieved by the positioning by the engaging convex portion 8a engaging with the engaging recess portion 64g2 of the first enlarged hole portion 64g.

The peripheral surface 8e formed by the circular arc having the small radius corresponding to the substantial rack shaft support portion of the inner peripheral portion 8d of the rack bush 8 is set to a peripheral surface region of a length corresponding to an angle θ within 180 degree on the peripheral surface in the bush inner peripheral portion 8d. The surface 8e is structured such as to support the back surface side of the rack tooth 21 of the rack shaft 2 by the peripheral surface of the range of the length. This structure prevents excessive contact between the rack shaft 2 and the rack bush 8 so as to facilitate smoothness of the movement for actuating the rack shaft 2 from being obstructed.

Further, the peripheral surface 8e formed by the circular arc supporting the rack shaft 2 and having the small radius is structured so as to be interfered with each other without being directly in contact with the rack shaft 2 when the deflection of the rack shaft 2 is not generated in the no load or low load state or in the state in which the deflection is small as described above. This structure supports the rack shaft 2 by the peripheral surface 8e when the deflection of the rack shaft 2 is large in the high load condition.

The engaging convex portion 8a positioning the bush 8 mentioned above is provided in an approximately center position in a peripheral direction of the outer peripheral portion 8b of the thick portion 8g of the rack bush 8. The rack bush 8 is made relatively thick in the peripheral surface 8e formed by the circular arc having the small radius corresponding to the substantial support surface of the rack shaft 2 and has a high strength.

Figure 5:
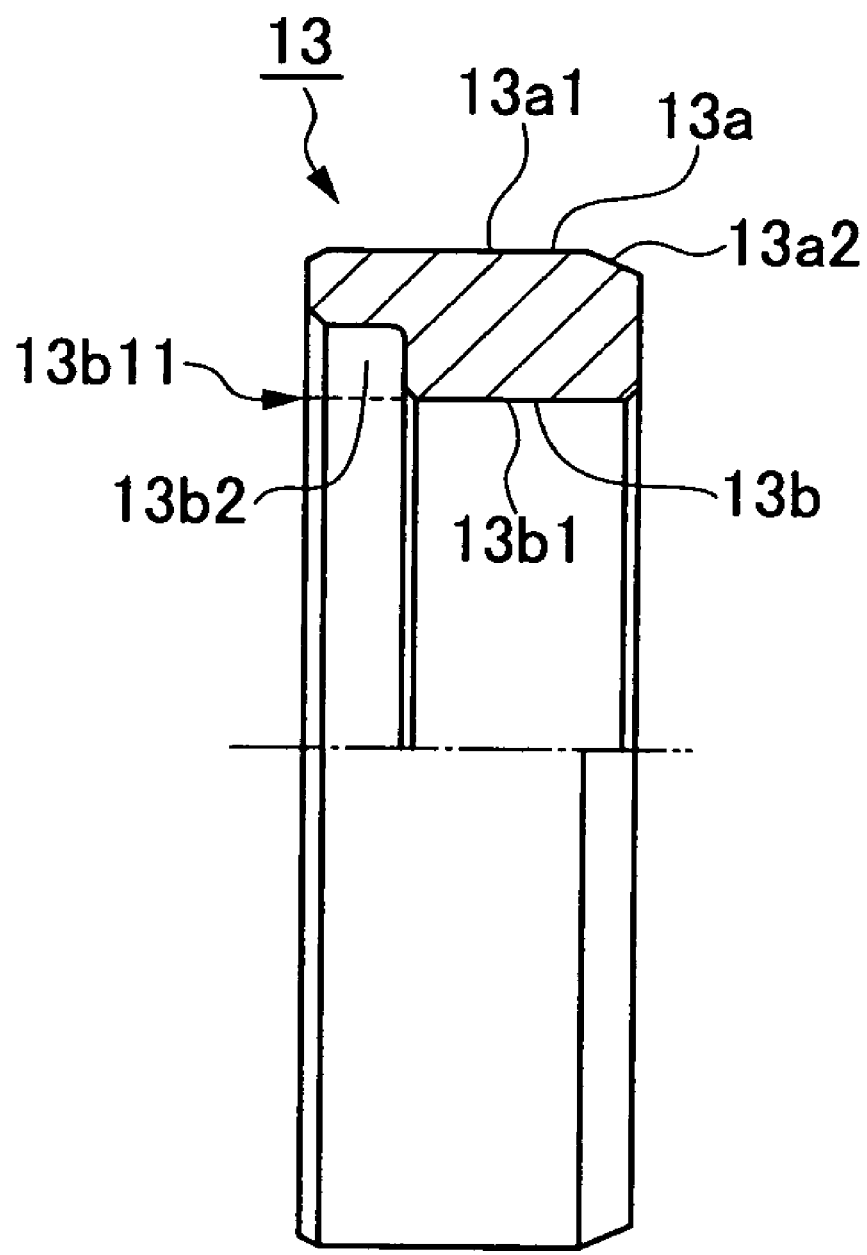
FIG. 5 is a view showing a stopper piece in accordance with the present invention.

The movement in the axial direction of the rack bush 8 fitted to the first enlarged hole portion 64g is inhibited by the stopper piece 13 press fit to the second enlarged hole portion 64i. The stopper piece 13 has a ring member which is made of a material such as a steel material or the like, and has a predetermined thickness and a predetermined width as shown in FIG. 5. Since an outer peripheral portion 13a thereof is press fit into the second enlarged hole portion 64i, the outer peripheral portion 13a is approximately equal to a diameter of the enlarged hole portion 64i and is larger than an outer diameter of the bush 8. The outer peripheral portion 13a is formed as an annular flat surface 13a1.

An inner peripheral portion 13b of the stopper piece 13 corresponding to the ring member has a small inner-diameter portion 13b1 which is arranged close to one end in the axial direction where a main body of the inner peripheral portion 13b is formed, that is, close to the rack bush 8 side when the piece 13 is press fitting, and a large inner-diameter portion 13b2 which is arranged close to the other end in the axial direction, that is, close to the opposite side to the bush 8 is also formed. The small inner-diameter portion 13b1 of the inner peripheral portion 13b in the stopper piece 13 allows the rack shaft 2 to deflect within an allowable range, and inhibits the deflection more than the allowable range.

The large inner-diameter portion 13b2 has a predetermined width for maintaining a pressure contact friction force required by the stopper piece 13 corresponding to the ring member which serves as the stopper. Accordingly, where the small inner-diameter portion 13b1 is provided all around the width of the ring (refer to a dotted portion in FIG. 5), the deflected rack shaft 2 is brought into contact with an outer end portion 13b11 thereof (refer also to FIG. 3) even in the case that the deflection of the rack shaft 2 is comparatively small within the allowable range.

Accordingly, in order to avoid the disadvantage mentioned above, the inner peripheral portion 13b in the outer end (the left end in the drawing) is enlarged so as to be formed as the large inner-diameter portion 13b2. In this manner, the inner-diameter portion 13b2 is formed as a run-off portion in the deflection of the rack shaft 2. The stopper piece 13 having the structure mentioned above is press fit into an inner peripheral portion 64i1 of the second enlarged hole portion 64i for inhibiting the rack bush 8 mentioned above from moving as mentioned above. Accordingly, the flat surface 13a1 of the outer peripheral portion 13a of the piece 13 is carefully finished, and a comparatively large chamfering process 13a2 is applied to both side edge portions.

Since the present embodiment is structured as mentioned above, the peripheral surface 8e formed by the circular arc having the small radius in the inner peripheral portion 8d of the rack bush 8 is not directly in contact with the back surface side of the rack tooth 21 of the rack shaft 2, when no load is applied to the rack shaft 2 and the shaft 2 is not deflected, or when the rack shaft 2 is exposed to the low load and the deflection of the shaft 2 is relatively small (for example, refer to FIG. 2A). Accordingly, in this state, the rack shaft 2 is substantially supported at two positions comprising the slidable ring member 9 close to the left end in FIG. 1 corresponding to the other support portion mentioned above, and the pressing portion 14b by the pressing apparatus 14.

The load caused by the reaction force from the tire wheel side (not shown) during traveling is applied to the rack shaft 2 on the basis of the steering operation. When the load becomes comparatively large, that is, becomes a high load, and the deflection of the rack shaft 2 becomes large, the rack shaft 2 is brought into contact with the peripheral surface 8e in the inner peripheral portion 8d of the rack bush 2, and the load of the rack shaft 2 is received by the peripheral surface 8e. Accordingly, the rack shaft 2 is supported at three positions comprising the peripheral surface 8e of the bush 8, the slidable ring member 9 corresponding to the other support portion mentioned above and the pressing portion 14b by the pressing apparatus 14 in this condition.

Since the present embodiment is structured as mentioned above, the following effects can be achieved.

Since the rack bush 8 is structured such that the inner peripheral portion 8d is formed in the annular peripheral surface similar to the circle in which the annular peripheral surface portion constituted by two circular arcs having different radii are continuously formed, the annular peripheral surface includes the peripheral surface 8e formed by the circular arc having the small radius and the peripheral surface 8f formed by the circular arc having the large radius. The rack shaft 2 to which the load is applied is slidably supported only by the peripheral surface 8e having the circular arc having the small radius occupying the length in the range of the angle θ within 180 degree on the annular peripheral surface of the inner peripheral portion 8d. It is thereby possible to avoid the bush 8 from being unnecessarily interfered with the rack shaft 2, and it is possible to achieve a suitable slidable support while intending to secure the smooth movement of the rack shaft 2.

In the case that the load applied to the rack shaft 2 is no load or the low load, the support of the rack shaft 2 in the peripheral surface 8e constituted by the circular arc having the small radius is accomplished at two positions comprising the support by the slidable ring member 9 corresponding to the other support portion mentioned above and the pressing portion 14b by the pressing apparatus 14. In the case of high load, the support is accomplished at three positions obtained by adding the peripheral surface 8e to the above support portions. Accordingly, the rack shaft 2 is supported in a reasonable and stable condition in correspondence to the load applied to the shaft 2. It is thereby possible to secure smooth engagement between the rack shaft and the pinion, to inhibit the sound generated by the engagement of the gears, and to improve durability of the gears.

The rack bush 8 includes the elastic body such as synthetic resin, rubber or the like and is provided with the engaging convex portion 8a in the outer peripheral portion 8b thereof. The convex portion 8a is fitted to the inner peripheral portion 64a of the tubular housing 64 of the gear housing 61, more particularly, the engaging recess portion 64g2 in the inner peripheral portion 64g1 of the first enlarged hole portion 64g when fitting and attaching the bush 8. It is thereby a simple matter to position the bush 8 in the rotating direction when attaching the rack bush 8, and it is possible to accurately attach the rack bush 8.

Since the rack bush 8 does not generate any displacement in the rotating direction even during use for a long time, it is possible to prevent the durability from being lowered due to the deformation and the abrasion of the bush 8. Also, the proper engaging state with no play between the rack tooth 21 and the pinion 3 can be maintained for a long time. Accordingly, it is possible to improve a durability of the rack shaft 2 and the pinion 3.

The side edge of the engaging recess portion 64g2 of the tubular housing 64 in the gear housing 61 is formed as the groove portion open in the second step portion 64h. The rack bush 8 can be easily fitted and attached to the tubular housing 64 by positioning the engaging convex portion 8a in the outer peripheral portion 8b of the bush 8 to the engaging recess portion 64g2 in the inner peripheral portion 64a, more particularly, the portion 64g1, of the tubular housing 64 so as to press from the axial direction. Since the engaging convex portion 8a in the outer peripheral portion 8b of the rack bush 8 is provided in the thick portion 8g of the bush 8, the strength thereof is comparatively high, and it is possible to accurately and stably position the bush 8 by the engaging convex portion 8a.

Since the chevron-shaped concave-convex portion 8c is provided approximately all around the surface of the peripheral surface of the outer peripheral portion 8b of the rack bush 8, and the concave-convex portion 8c is relatively easily deformed, it is a simple matter to fit and attach the bush 8 to the inner peripheral portion 64g1 of the tubular housing 64. The support of the rack shaft 2 by the rack bush 8 achieves the effect of reducing a shock load applied to the rack shaft 2.

Figure 6A:
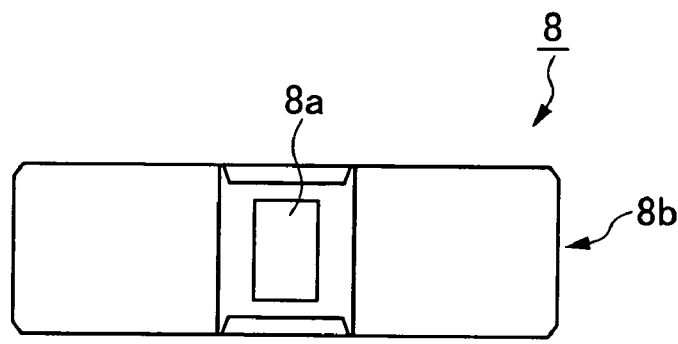
Figure 6B:
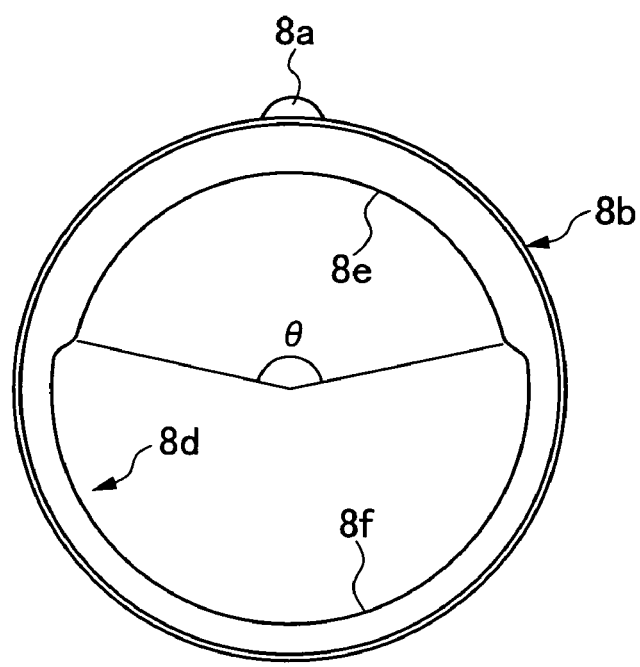
Figure 7A:
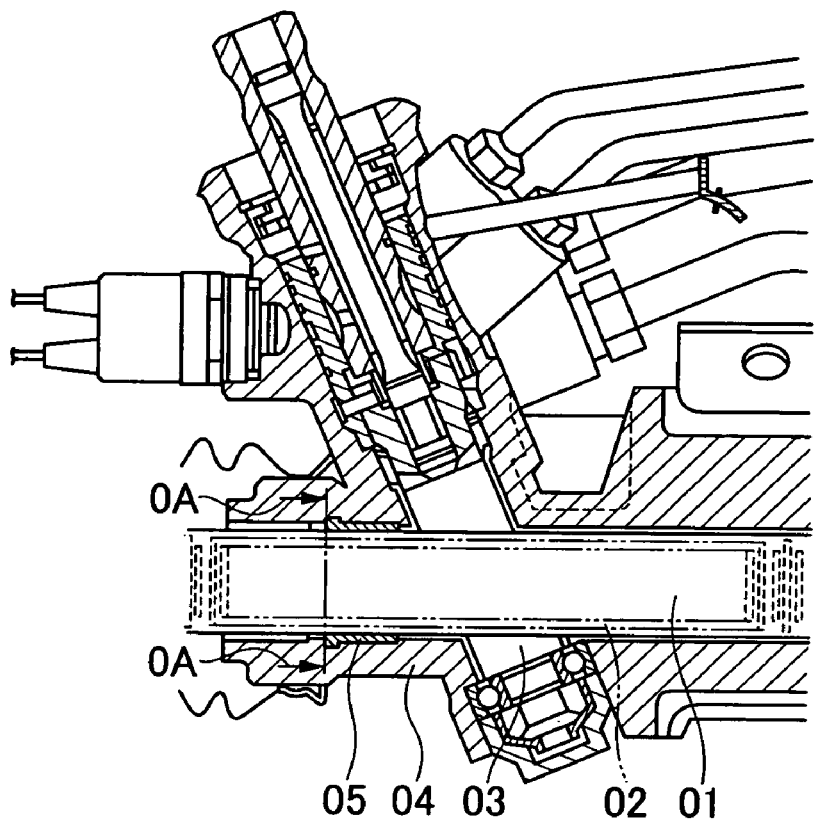
Figure 7B:
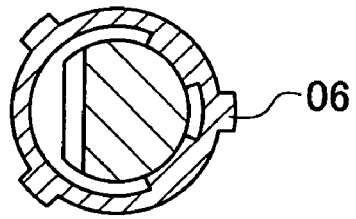
Figure 8A:
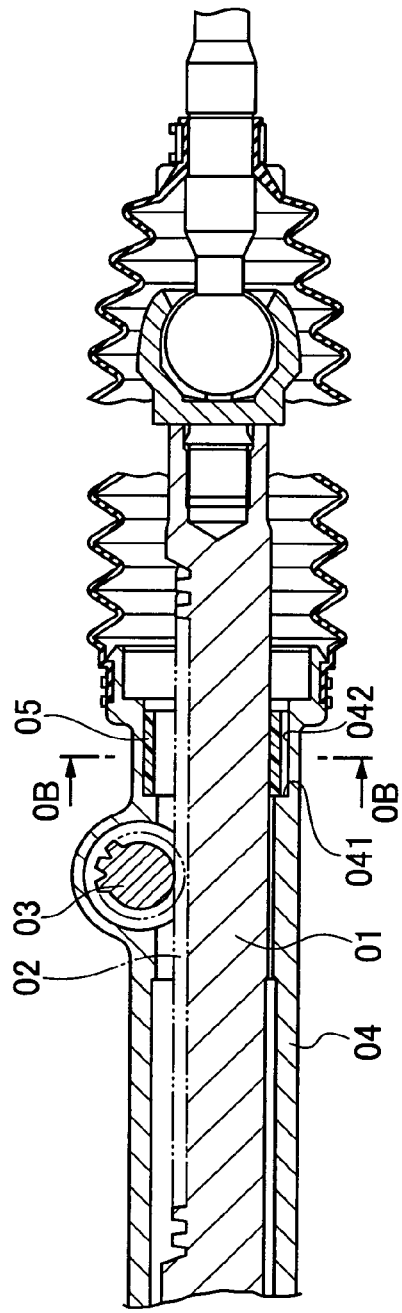
Figure 8C:
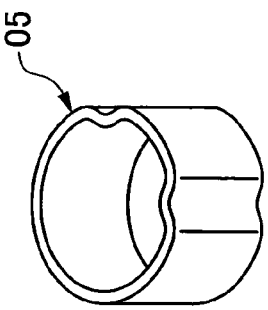
Figure 8B:
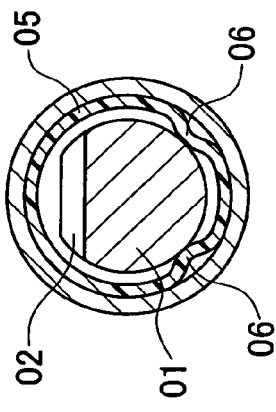

The rack bush 8 in the embodiment mentioned above is structured such that the outer peripheral portion 8b is formed as the surface provided with the chevron-shaped concave-convex portion 8c all around the surface. The portion provided with the engaging convex portion 8a, however, can employ an aspect that the chevron-shaped concavo-convex portion 8c mentioned above is not provided in the outer peripheral portion 8b of the rack bush 8 as illustrated in FIGS. 6A and 6B. In this manner, the stability of supporting the rack shaft 2 by the rack bush 8 is high.

As mentioned above, the bush is provided with the convex portion engaging with the engaging recess portion in the inner surface portion of the gear housing in the outer peripheral portion, and is fixed by the locking member, in the rack and pinion type power steering apparatus. The bush is attached to the inner surface portion of the gear housing by the engagement of the engaging convex portion in the outer peripheral portion of the bush with the engaging recess portion in the inner peripheral portion of the gear housing. The positioning of the bush with respect to the housing can be easily and securely achieved, assembling properties are improved, and it is possible to securely inhibit the bush from being rotated relative to the gear housing in the attaching state.

The present invention is structured such that the bush has two circular arcs having the different radii in the inner surface, and the circular arc having the smaller radius is formed within 180 degree, in the rack and pinion type power steering apparatus. It is possible to avoid unnecessary interference with the inner surface of the bush in the movement of the rack shaft, and it is possible to achieve the proper slidable support while maintaining smooth movement of the rack shaft.

The present invention is structured such that the bush has two circular arcs having the different radii in the inner surface. One circular arc corresponds to the surface which is in contact at a time when the rack shaft is deflected, and the other circular arc is formed as the surface which is not in contact at a time when the rack shaft is deflected, in the rack and pinion type power steering apparatus. It is possible to stably support the rack shaft in correspondence to the load applied to the rack shaft while maintaining the smooth movement of the rack shaft.

The present invention is structured such that the rack shaft is supported at two points 9 and 14 under low load conditions, and is supported at three points 9, 14 and 8 under high load conditions. The support structure of the rack shaft of the rack and pinion type power steering apparatus slidably supports the rack shaft to the gear housing via the bush made of the synthetic resin or the like. It is possible to stably support the rack shaft reasonably in correspondence to the load applied to the rack shaft. Smooth engagement between the rack tooth and the pinion can be achieved while inhibiting play of the rack shaft. It is possible to inhibit the sound generated by the engagement of the gears from being generated. Further, it is possible to improve the durability of the rack tooth and the pinion.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A rack and pinion type power steering apparatus, comprising:
    a deflectable rack shaft slidingly supportable to a gear housing, the rack shaft being supported at a first part and a second part and being unsupported at a third part under a first lower applied load condition, said third part being in closer proximity to said second part than said first part's proximity to said second part, the rack shaft being supported at said first and second and further at said third part under a second higher applied load condition, the rack shaft being deflected only under said second higher load condition to move into compressive contact with a ring-shaped rack bush said first, second and third parts being separated longitudinally, the second part being disposed between said first and third parts,
    a ring member slidably supported the rack shaft at the first part under both said first load and said second higher applied load conditions,
    a pressing element supporting the rack shaft at the second part and both said first load and said second higher applied load conditions,
    said ring-shaped rack bush having at least two different thicknesses in a single cross section which ring-shaped rack bush supports the rack shaft at the third part only under said second higher applied load condition due to deflection of the rack shaft into contact with the ring-shaped rack bush, the ring-shaped rack bush in a single cross section having a first and a second circular arc each having different radii in an inner surface, the first circular arc having a first smaller radius being less than 180° and having a thicker cross sectional area than the second circular arc which said second circular arc has a second larger radius greater than 180 degrees, the rack shaft coming into contact with an inner surface of the first smaller radius only during rack shaft deflection, the ring-shaped rack bush having convex portion along an outer peripheral portion of the bush, engaging with an engaging recess portion in an inner surface portion of the gear housing, the convex portion disposed on the outer periphery of the thicker cross sectional area, a portion of the lamer circular arc always separated from contact with the rack shaft,
    a first resilient stopper element disposed around a periphery of the rack shaft near said first part, a second resilient stopper element disposed around a periphery of the rack shaft near said third part, an open ring-shaped stopper disposed at the third part against a distal side of the bush, open ring-shaped stopper fixing the bush place and being positioned to arrest inward lateral movement of the rack shaft by abutment against the second resilient stopper element, said ring shaped stopper having an internal diameter which allows deflection of the rack shaft within a predetermined range, and which inhibits deflection of the rack shaft that is greater than the predetermined range.

2. A rack and pinion type power steering apparatus as claimed in claim 1, wherein an engagement portion between a rack tooth of the rack shaft and the pinion is received in the gear housing, the gear housing being provided with a hole portion extending in a direction of the rack shaft, a first enlarged-hole portion forming a first step portion from the hole portion and having an enlarged inner diameter, a second enlarged-hole portion forming a second step portion from the first enlarged-hole portion and having an enlarged inner diameter, and a third enlarged-hole portion forming a third step portion from the second enlarged-hole portion and having an enlarged inner diameter in a rack shaft extending direction, the engaging recess portion with which the convex portion of the bush is positioned and engaged being disposed at an inner peripheral portion of the first enlarged-hole portion, and wherein the ring shaped stopper fitted to the second enlarged-hole portion.

3. A rack and pinion type power steering apparatus as claimed in claim 1, wherein a plurality of chevron-shaped concave-convex portions having a smaller height than that of the convex portion and extending in a width direction of the bush are provided around the periphery of the bush at locations other than the convex portion provided in the outer peripheral portion of the bush.

4. A rack and pinion type power steering apparatus as claimed in claim 1, wherein the ring shaped stopper has a first small inner-diameter portion disposed close to the bush, and a large inner-diameter portion disposed proximate to an opposite side of said first portion.

* * * * *